US007814068B2

(12) United States Patent
McDonald et al.

(10) Patent No.: US 7,814,068 B2
(45) Date of Patent: Oct. 12, 2010

(54) IDENTIFYING CHANGED RECORDS IN A FILE STORED ON AN ELECTRONIC TOKEN

(75) Inventors: Omid McDonald, Ottawa (CA); Philip Painter, Nepean (CA); David McDonald, Ottawa (CA)

(73) Assignee: Gemalto SA, Paris (FR)

( * ) Notice: Subject to any disclaimer, the term of this patent is extended or adjusted under 35 U.S.C. 154(b) by 1755 days.

(21) Appl. No.: 09/987,828

(22) Filed: Nov. 16, 2001

(65) Prior Publication Data

US 2003/0097382 A1    May 22, 2003

(51) Int. Cl.
    *G06F 17/00*    (2006.01)
(52) U.S. Cl. ..................... 707/687; 697/699
(58) Field of Classification Search ......... 707/201–204, 707/3, 101, 687–699; 445/558; 709/248
    See application file for complete search history.

(56) References Cited

U.S. PATENT DOCUMENTS

| | | | | |
|---|---|---|---|---|
| 5,309,501 A * | 5/1994 | Kozik et al. | ................. | 455/410 |
| 5,649,089 A * | 7/1997 | Kilner | ............................ | 714/6 |
| 5,765,172 A * | 6/1998 | Fox | ............................ | 707/204 |
| 5,913,160 A * | 6/1999 | Leung | ........................ | 455/403 |
| 5,915,225 A | 6/1999 | Mills | ............................ | 455/558 |
| 5,924,045 A * | 7/1999 | Thauvin et al. | ............. | 455/558 |
| 5,970,502 A * | 10/1999 | Salkewicz et al. | ........... | 707/201 |
| 5,974,238 A * | 10/1999 | Chase, Jr. | ................... | 709/248 |
| 6,029,175 A | 2/2000 | Chow et al. | ................. | 707/104 |
| 6,055,442 A * | 4/2000 | Dietrich | ..................... | 455/558 |
| 6,161,020 A * | 12/2000 | Kim | ............................ | 455/466 |
| 6,278,885 B1 * | 8/2001 | Hubbe et al. | ................. | 455/558 |
| 6,301,484 B1 | 10/2001 | Rogers et al. | ................ | 455/466 |
| 6,385,199 B2 * | 5/2002 | Yoshimura et al. | .......... | 370/393 |
| 6,705,529 B1 * | 3/2004 | Kettunen et al. | ............. | 235/486 |
| 6,718,348 B1 * | 4/2004 | Novak et al. | ................. | 707/201 |
| 6,879,989 B2 * | 4/2005 | Cheng et al. | ................. | 707/201 |
| 6,968,209 B1 * | 11/2005 | Ahlgren et al. | ............. | 455/558 |
| 2001/0041592 A1 * | 11/2001 | Suonpera et al. | ............ | 455/557 |
| 2001/0046854 A1 * | 11/2001 | Henry et al. | ................. | 455/419 |
| 2002/0049071 A1 * | 4/2002 | Bjorn | ......................... | 455/550 |
| 2003/0038791 A1 * | 2/2003 | Chou | ......................... | 345/204 |

FOREIGN PATENT DOCUMENTS

CA        2264846        11/2005

(Continued)

OTHER PUBLICATIONS

Article: "SyncML—Getting the mobile Internet in sync", Jönsson et al., Ericsson Review No. 3, 2001.

*Primary Examiner*—Don Wong
*Assistant Examiner*—Hanh B Thai
(74) *Attorney, Agent, or Firm*—Ogilvy Renault LLP

(57) ABSTRACT

A method and system for detecting change to a record in a file stored on an electronic token involves storing a change detection code (CDC) so that a change detection applet can calculate a current CDC for corresponding record(s), and compare the current CDC with the stored CDC to determine if data has changed. Any changes to records are registered by a registering element that provides a service feature, back-up of the file and/or synchronizes the file with other files stored remotely. One use of the method is to back-up phonebook records on USIM/SIM cards.

23 Claims, 4 Drawing Sheets

FOREIGN PATENT DOCUMENTS

| | | |
|---|---|---|
| EP | 1034676 B1 | 2/1998 |
| EP | 836 340 A2 | 4/1998 |
| EP | 1034670 B1 | 11/1998 |
| GB | 2 317 246 | 3/1998 |
| GB | 2 373 139 | 9/2002 |
| WO | WO 97/36437 | 10/1997 |
| WO | WO 99/52066 | 10/1999 |
| WO | WO 01/03409 | 1/2001 |

* cited by examiner

US 7,814,068 B2

IDENTIFYING CHANGED RECORDS IN A FILE STORED ON AN ELECTRONIC TOKEN

CROSS-REFERENCE TO RELATED APPLICATIONS

This is the first application filed for the present invention.

MICROFICHE APPENDIX

Not applicable.

TECHNICAL FIELD

The invention generally relates to the identification of changed records in a file stored on an electronic token; and, in particular, to a method and system for reporting identified changed records for the purposes of file synchronization, file updating, file back-up, or triggering service provision.

BACKGROUND OF THE INVENTION

Electronic tokens are a relatively new commodity that have been found to be useful in many applications. Smart Cards, and similar portable electronic tokens have been used in a wide variety of commercial applications, including security, banking, health care, and communications applications. Some of the recognized limitations of these electronic tokens include relatively small memories, and slow communication. Generally the communications limitations involve a trade off between mobility, cost and the rate of transmission of information.

As is known in the art, electronic tokens usually operate when docked with an electronic token reader, which supplies power to the electronic token, and exchanges data with the electronic token using a predefined protocol. There are a wide and growing class of devices that dock electronic tokens, and there are efforts to standardize and expand the standards to encompass as many devices as can benefit from services enhancements that an electronic token can provide.

There are a number of service enhancements that require a determination of data in records of a file stored in the memory of an electronic token. Many service enhancements involve repeated contact with the same electronic token, and therefore only require a determination of changes to the records.

A conventional electronic token 10 is schematically illustrated in FIG. 1. The electronic token 10 contains a processor 12, at least one input/output (I/O) port 14 and a memory 16. The processor 12 is adapted to exchange data with a platform in which it is docked, through the I/O port 14. The processor also exchanges data with a memory 16 that stores processor instructions 18, an operating system (not illustrated), and a data store that stores a file system 20. An electronic token can execute token resident processor instructions 18, known as applets. Applets can direct the token's processor 12 and/or operating system to perform various functions including modifying the token's file system and communicating via its input/output port 14.

One use of electronic tokens for communications is embodied in subscriber interface module (SIM) cards. The SIM is defined as part of the global system for mobile communications (GSM) standard. The SIM card is an electronic token having processors and memory, that can be inserted into any GSM station (usually a cell phone), and provides a standard complement of subscriber related data to the GSM station. As is known in the art, the GSM station interfaces with the card for the purposes of exchanging data using a predefined protocol (also specified by the GSM standard). The SIM includes a processor, non-volatile memory (such as electronically erasable programmable read-only memory (EEPROM)) and a volatile random access memory. When docked in a GSM station, SIM resident applets can transmit and receive data to/from the communications network via short message service (SMS) messages. A newer standard called the universal SIM (USIM) defines another electronic token adapted to be docked in a communications station.

In accordance with the GSM standard, some of the data stored on a SIM card is allocated to a phonebook. The phonebook comprises a plurality of records for individual directory numbers called abbreviated dialing numbers (ADN). As SIM cards can be lost, damaged or stolen, a need for backing-up the phonebook, and other personal data stored on SIM cards, has been recognized. Methods for backing-up a phonebook in the prior art required connecting the platform in which the SIM is docked (GSM handset, or electronic token reader) to a computer. Specific software loaded on the computer would access the SIM file system to perform the backup. While this is an efficient method for backing-up changes to files when the platform in which the SIM is docked can be connected to a computer, the mobile nature of such platforms makes it difficult to ensure that back-up can be performed regularly.

What is therefore needed is a token-resident applet for detecting changed records stored in a file on an electronic token and communicating those changes to an external entity.

SUMMARY OF THE INVENTION

It is therefore an object of the invention to provide a token-resident method for detecting changes to records in a file stored on an electronic token.

Another object of the invention is to provide a method for enabling any one of the following; the back-up of records stored on an electronic token, synchronization of a file on an electronic token with files stored on other devices, and a service feature in dependence on a change in data stored on the electronic token.

Accordingly a method is provided for identifying changes to records in a file on an electronic token. The method involves steps of calculating at least one change detection code (CDC) for records stored on the electronic token; and comparing the calculated CDC of each record with a stored CDC. If the stored CDC does not equal the calculated CDC, a change is detected, and, in accordance with the method, registration of the change is effected.

According to one aspect of the invention, the CDC is a value obtained by a set of operations on one or more of the records, and contains as much information as possible to unambiguously identify the one or more records using the fewest bits. The CDC may be a cyclical redundancy check CRC, which are known in the art.

According to another aspect of the invention, the step of comparing yields information regarding the change, such as, for instance how the record(s) changed, or how the change was brought about. A change may be categorized as an addition, a deletion, or a modification.

A token resident applet may issue a message, via the electronic token reader in which it is docked, containing changes to the token's file system. The notice of change (NOC) message contains changed record information in a predefined format. Generally, a NOC contains a record(s) identifier, a change type identifier, and if needed the data contained in the changed record(s). In the case of a SIM token, the NOC message may be sent by a SIM applet in a SMS message via its host token reader (GSM station). The SIM applet may formulate a notice of change (NOC) message for each changed record in a file. The applet may insert as many NOC messages into a SMS message as possible.

In accordance with another aspect of the invention, a response pending flag is used, optionally with other flags needed for identifying a change type, to ensure that even if an NOC message is not registered, the changes can be resent later. Accordingly when a message is to be sent to register a change, the response pending flag is set in relation to that record(s). The response pending flag is released when the message is acknowledged. If the number of change types requires more information be retained, one or more other flags may be used to identify the change type pending acknowledgement. In this case the flags in conjunction with the stored and calculated CDCs are used together to determine if a notice of change message needs to be sent.

In accordance with an object of the invention the registration of a change to a record(s) is performed by a registering element. A registering element may be software adapted to back-up an electronic token's file system, synchronize an electronic token's file system across multiple data stores, and/or provide a service feature in dependence on changes to an electronic token's file system.

In one embodiment of the invention, the electronic token comprises a subscriber identity module (SIM) card, the file comprises a phonebook standardized by global system for mobile communications (GSM) or universal SIM (USIM), and records comprise abbreviated dialing numbers (ADNs).

An apparatus for supporting this invention therefore includes the electronic token, the electronic token reader, the infrastructure for issuing messages from the electronic token, through the electronic token reader to the registering element, and the registering element.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF THE PREFERRED EMBODIMENT

The present invention provides a method for identifying changed records in a file stored on an electronic token. In particular, the invention provides a method for backing-up, synchronizing or providing a service in dependence on changes to records stored on electronic tokens.

Figure 1:
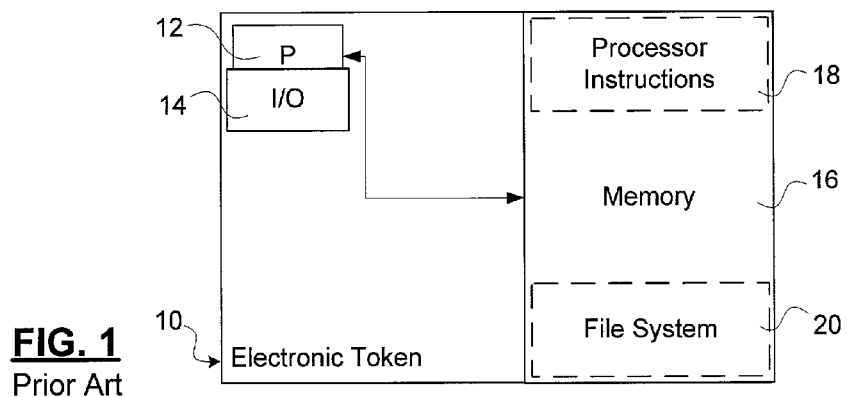
FIG. 1 is a schematic diagram of a prior art electronic token.
Figure 2:
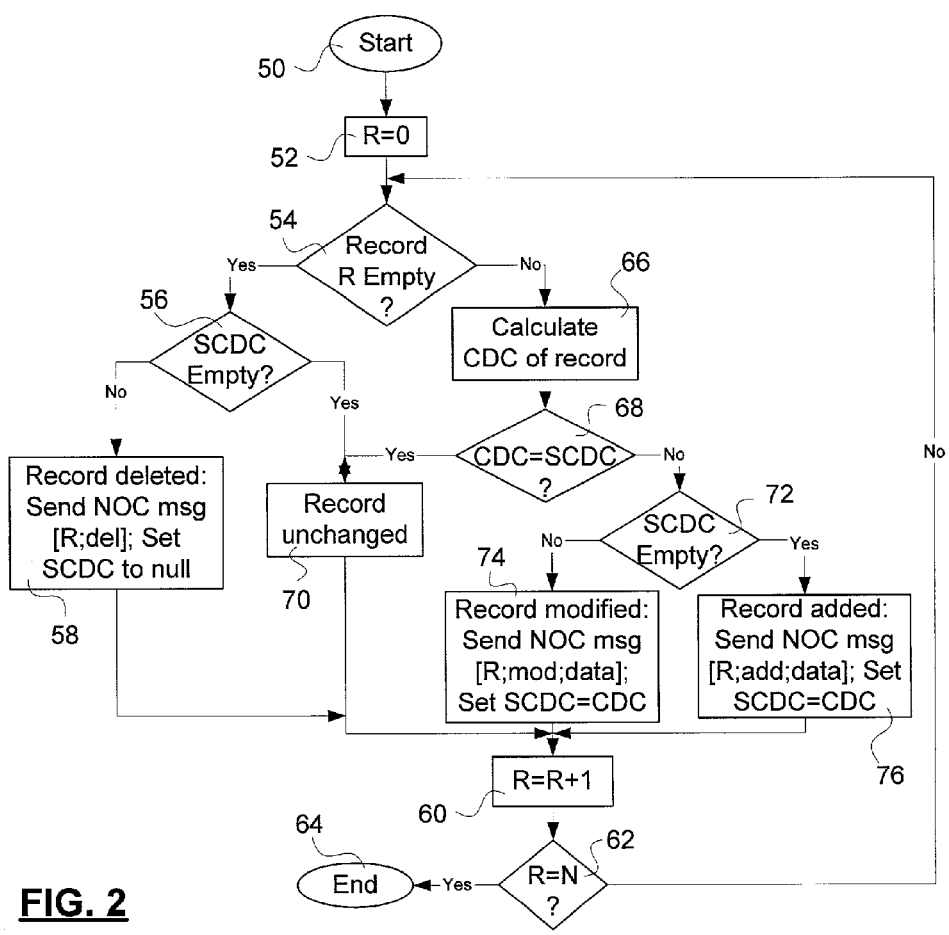
FIG. 2 is a flow chart illustrating principal steps involved in a method in accordance with the present invention for identifying added, deleted or modified records in a file stored on an electronic token.

Illustrated in FIG. 2 is a flow diagram of a process performed by an applet executing on an electronic token 10 to determine changes that were effected by adding, deleting or modifying records in a file. A first application of the method involves assigning memory to the applet, and initializing a set of stored change detection codes (SCDCs), each of which is associated with a respective record in a file stored in the memory 16 of the electronic token 10.

In step 50 the method begins, and R, a counter for the N records in the file, is initialized (step 52). In step 54, it is determined if record R is empty. If, in step 54 it is determined that R is empty, it is determined (step 56) if a stored change detection code (SCDC) associated with R is also empty (zero). If the SCDC is not empty, the record has been deleted since the SCDC was generated, and the applet issues a notice of change (NOC) message comprising "R" the indicator of the record R, and a deletion indicator (step 58). The applet also sets the SCDC of the record R to empty, in step 58. The applet then increments R (step 60), determines if another record exists (step 62), and, if R=N (there is no next record), the applet ends (step 64). If, in step 62, it is determined that R<N, the method returns to step 54.

If, in step 54, the record R is found not to be empty, the change detection code (CDC) of the record R is calculated (step 66). In step 68, it is determined if the CDC of record R is equal to the SCDC of record R. If, in step 68 equality is found, the record R is deemed unchanged (step 70), and the method continues to step 60.

If, in step 68, the CDC and SCDC of record R are not found to be equal, it is determined if the SCDC is empty (step 72). If the SCDC is not empty, the applet issues a NOC message containing "R", a modification indicator, and the data contained in record R. The applet then sets the SCDC to the value of the CDC, and proceeds to step 60. If, on the other hand, the SCDC is found to be empty in step 72, the applet issues a NOC message containing "R", an addition indicator, and the data contained in record R. The applet then sets the SCDC to the value of the CDC, and proceeds to step 60. The NOC message is forwarded to a registering element for registration of the change.

Figure 3:
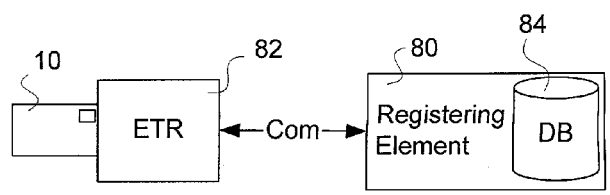
FIG. 3 is a block diagram of a system in accordance with the invention.

As schematically illustrated in FIG. 3, the applet forwards changed records in a file stored on the electronic token 10 to a registering element 80. The electronic token 10 is docked in an electronic token reader 82, which may be a mobile or a stationary platform or a station adapted to interface with the electronic token 10. The electronic token 10 dispatches messages to, and receives messages from the registering element 80 via the electronic token reader 82. The communications may be sent over a wireless or wireline communications medium, and may involve any number of networks and network elements in the process.

The registering element 80 may be one of any number of service provider servers that is adapted to track information stored on the electronic token 10. A few areas where such a system is useful include government services; such as taxation, health care, welfare, employment insurance and licenses; employee location and productivity monitoring; and personal location monitoring. There are many service features that may be applied in dependence on changes to records stored in a file on an electronic token 10. The registering element 80 will likely include a database 84 for individual users or subscribers to store information related to the subscriber and the specific service or monitoring functions of the registering element 80. The records stored on the electronic token may contain reference or transactional data. For example, drug prescription records stored on a government health card, or records related to movement within a facility stored on a security access card.

For any one of several reasons well known in the art, a detected change may fail to be registered after it is reported by the electronic token 10. Consequently, it is preferably that the applet be designed to compensate for such failures. One method for doing so involves requiring an acknowledgement to be sent for NOC messages received and registered by the registering element 80. Any record for which a NOC message is sent is flagged until an acknowledgement is received. Since the method illustrated in FIG. 2 provides notification of three types of change, two flags are required to determine if a NOC message has been acknowledged. A determination can be made respecting the content of a next message to be sent. The two flags marginally increase the amount of data stored by the applet, but the two flags and the CDCs use much less memory than a redundant copy of the changed records in a file.

Figure 4:
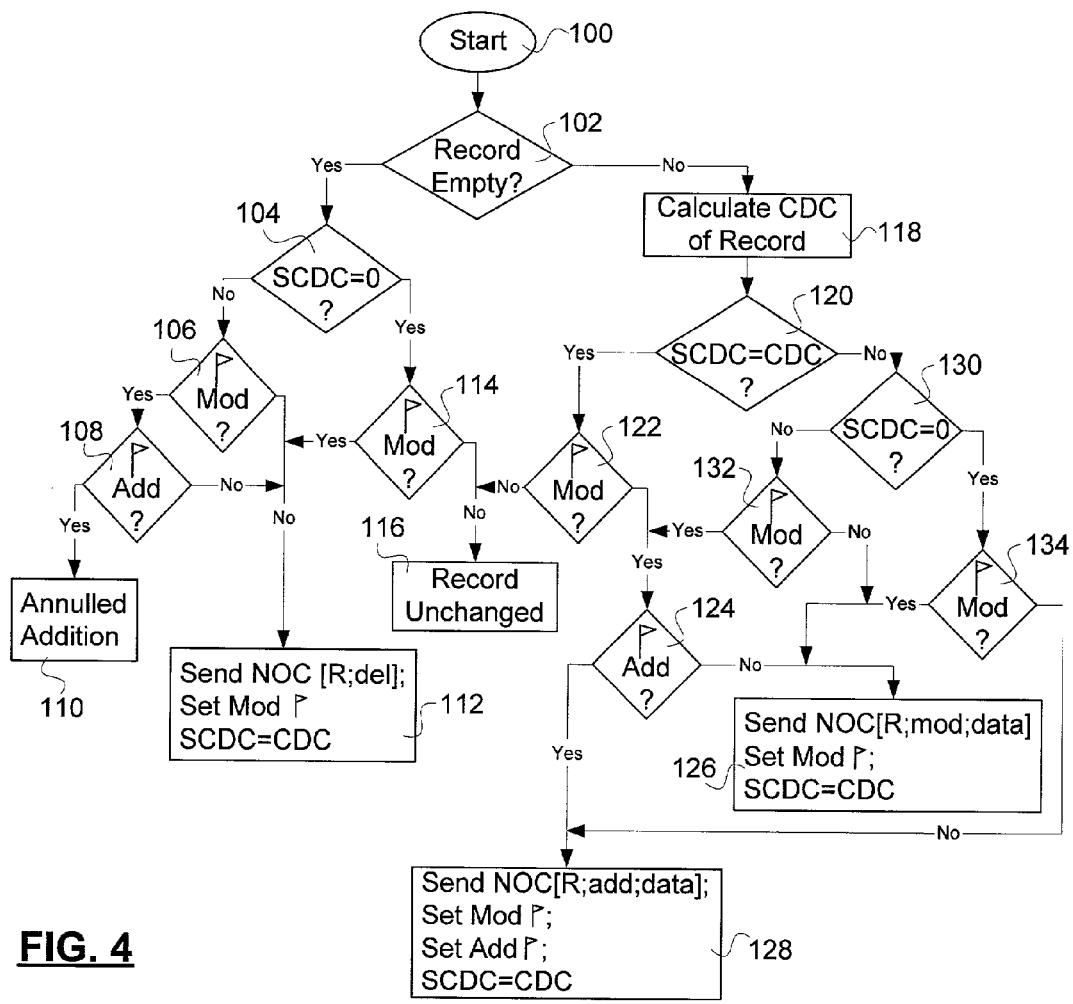
FIG. 4 is a flow chart illustrating principal steps involved in a fail-safe method of the present invention, for reporting added, modified or deleted records in a file, stored on an electronic token.

FIG. 4 illustrates the logic executed by a change detection applet using two response pending flags to determine the type of change sent in an unacknowledged NOC message, so that an appropriate new message can be sent. In accordance with the method used by the change detection applet illustrated in FIG. 4, a modification flag is set prior to replacing the value of a SCDC with a calculated CDC. If the change is an addition, then an addition flag is also set. In the present embodiment, it is assumed that the change detection code is a check sum (CS). Any one of the many cyclic redundancy check (CRC) algorithms known in the art may be used. For brevity, the description of the method addresses only the process for determining if one record is changed since a last acknowledged NOC message was sent. The process may be repeated for each record in a file. Alternatively, as is well understood in the art, memory for storing CDCs can be conserved if only one CDC is calculated for two or more consecutive records in the file. Thus memory for storing CDCs is conserved at the expense of the size of messages that must be sent when a change is detected, since data associated with all records associated with a single CDC must be sent to a registering element when a change is detected. For the sake of convenience in the discussion that follows, it is assumed that each CDC is associated with a single record.

In step 100 the applet examines a record in the file. If the record is determined to be empty (step 102), it is determined (step 104) whether the stored CDC (SCDC) of the record is 0. If not, the record is changed with respect to its value at the last time the CDC was calculated. It is then determined if a modification flag (mod flag) is set for the record (step 106). If, in step 106, the mod flag is set, it is determined, in step 108, if the add flag is also set. If the add flag is also set, then, logically, the record was empty, data was subsequently added, the addition was not confirmed to be registered, and now has been deleted. The applet therefore sends nothing (step 110). If, in step 106 the mod flag is found not to be set, or the add flag is not set in step 108, the change detection applet sends a delete NOC message to the registering element, sets the mod flag in relation to the record, and sets the record's SCDC to zero (step 112). If, in step 104, it is determined that the SCDC=0, and, if the mod flag is not set (in step 114) no change is detected (step 116). If the mod flag is set (step 114) the applet advances to step 112.

If, in step 102, it is determined that the record is not empty, the CDC of the record is calculated (step 118). In step 120, it is determined if the CDC equals the SCDC. If the CDC and SCDC are equal, and it is determined (in step 122) that the mod flag is not set, no change is detected (step 116). If, in step 122, the mod flag is found to be set, the change detection applet determines (in step 124) if the add flag is also set. If the add flag is not set, logically the unregistered NOC last sent was a mod NOC, and since then no change has been made. Consequently, the change detection applet issues a NOC containing the record indicator, the change indicator (mod) and a current value of the record, sets the mod flag for the record, and sets the SCDC to the CDC (step 126). If the add flag is found to be set in step 124, the unregistered NOC last sent was an add NOC, and since then no change has been made. Consequently, the change detection applet reissues a NOC containing the record indicator, the change indicator (add) and the current value of the record, sets the mod flag and the add flag for the record, and sets the SCDC to the CDC.

If, in step 120 it is determined that the SCDC does not equal the CDC, it is determined (step 130) if the SCDC is zero. If the SCDC is zero, and it is determined (step 132) that the mod flag for the record is not set, the change detection applet advances to step 126. If, in step 132, the mod flag is set, the change detection applet advances to step 124. If, in step 132, it was determined that the mod flag was set, and if the add flag is subsequently found not to be set, the record was modified, but the mod NOC was not confirmed to be registered, and subsequently the record has been modified again.

If it is determined, in step 130, that the SCDC=0, then it is determined, in step 134, whether the mod flag is set for the record. If the mod flag is set, then a "delete" NOC was last sent, but it has not been acknowledged. Consequently, the change detection applet advances to step 126. If the mod flag was found not to be set (step 134), then the applet advances to step 128.

Figure 5:
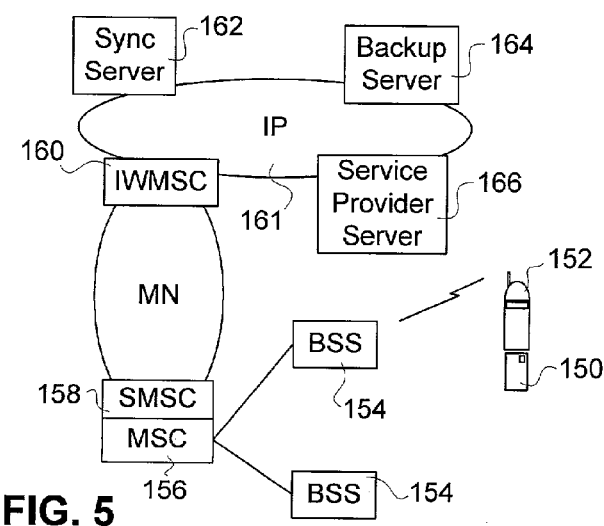
FIG. 5 is a block diagram of an system for providing synchronization, back-up or a service feature to a subscriber with a SIM card and a GSM station.

FIG. 5 schematically illustrates an exemplary system for enabling registration of detected changes in a record stored in a file on a smart card docked in a communications enabled device. In this example, the electronic token 10 is a SIM card 150 in a global system for mobile communications (GSM) phone 152. The GSM phone 152 is in wireless communications with (usually at least one) base station system (BSS) 154, which relays signals between the GSM phone 152 and a mobile switching center (MSC) 156. The MSC 156 switches data received from the GSM phone 152 according to its type. Voice data, or modulated data sent over a voice channel is switched to a public switched telephone network by the MSC 156, whereas short message service (SMS) messages issued from the GSM phone 152 are switched to an SMS center (SMSC) 158. In accordance with the invention, some of the SMS messages contain at least a part of at least one NOC message. As is known in the art, a length of an SMS message is limited to a predetermined number of characters (about 100 to about 200, depending on a number of parameters of the equipment used). The NOC messages may be variable length messages. The number of NOC messages that an SMS message can accommodate is therefore variable.

The SMSC 158 forwards the SMS message to a registering element to which they are addressed. An interworking MSC (IWMSC) 160 may relay the message between the SMSC and devices connected to other networks, as is well known in the art. There are a number of service features that can be provided in such an arrangement. A synchronization service feature, for instance, may provide for continuous updates to files that are shared by a plurality of remote memory stores, such as phonebook records stored on the GSM phone 152, and also stored on other devices. A synchronization server 162 is adapted to perform this service in a manner well known in the art. Synchronization will be discussed in more detail below with reference to FIG. 7. Another application enables back-up of the records. A back-up server 164 may be used in accordance with the present invention to back-up a phonebook so that if the SIM card 150 is lost, damaged or stolen, the abbreviated dialing number (ADNs) stored in the phonebook will not be lost. Many other service features can be provided in dependence on changes to a phonebook file, or other files stored on a SIM card. For example, a user group may be subscribed/unsubscribed to by adding/deleting of a name in a phonebook. Other such services performed in dependence on a notification of a change in a record on the SIM card 150 may be performed by a service provider server 166.

Figure 6:
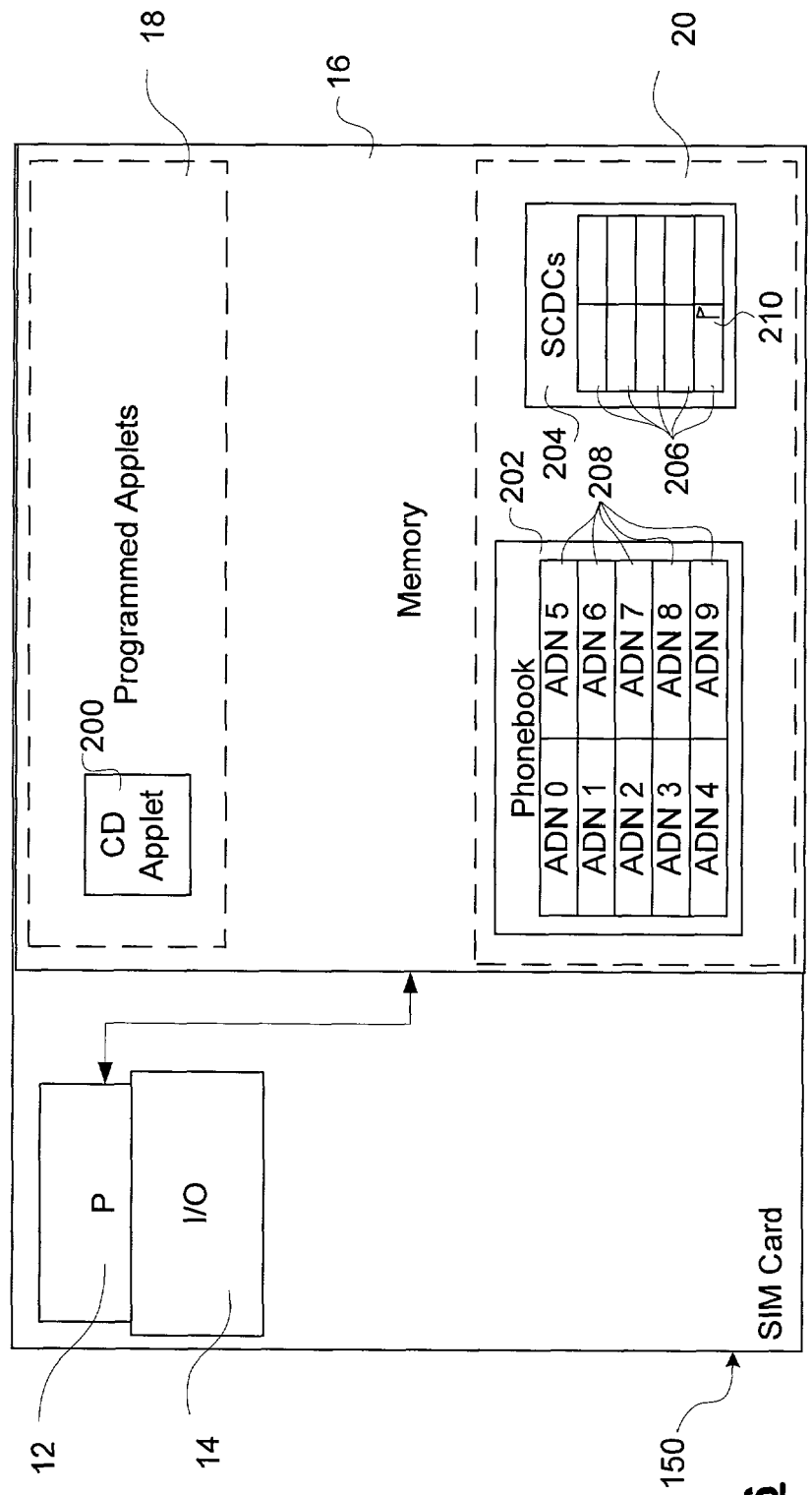
FIG. 6 is a schematic diagram of a SIM card having a change detection applet in accordance with the invention and associated memory stores.

FIG. 6 is a block diagram illustrating principal components of a SIM card 150 adapted to execute the change detection applet of FIG. 4. As the SIM card 150 is an electronic token 10, it includes a processor 12, an I/O port 14 and a memory 16 for storing applets 18 and files 20. The change detection (CD) applet 200 is stored as an applet 18 on the memory 16. The phonebook 202 is one of the files 20 stored in the memory 16. A file of SCDCs 204 is also stored in the memory 16. Each CDC 206 in the file of CDCs 204 is associated with a respective ADN 208 stored on the phonebook 202. Each of the ADNs 208 has a stored CDC associated with it, and a modification (mod) pending flag 210 is set in relation to one of the ADNs 208 (AND 4).

Figure 7:
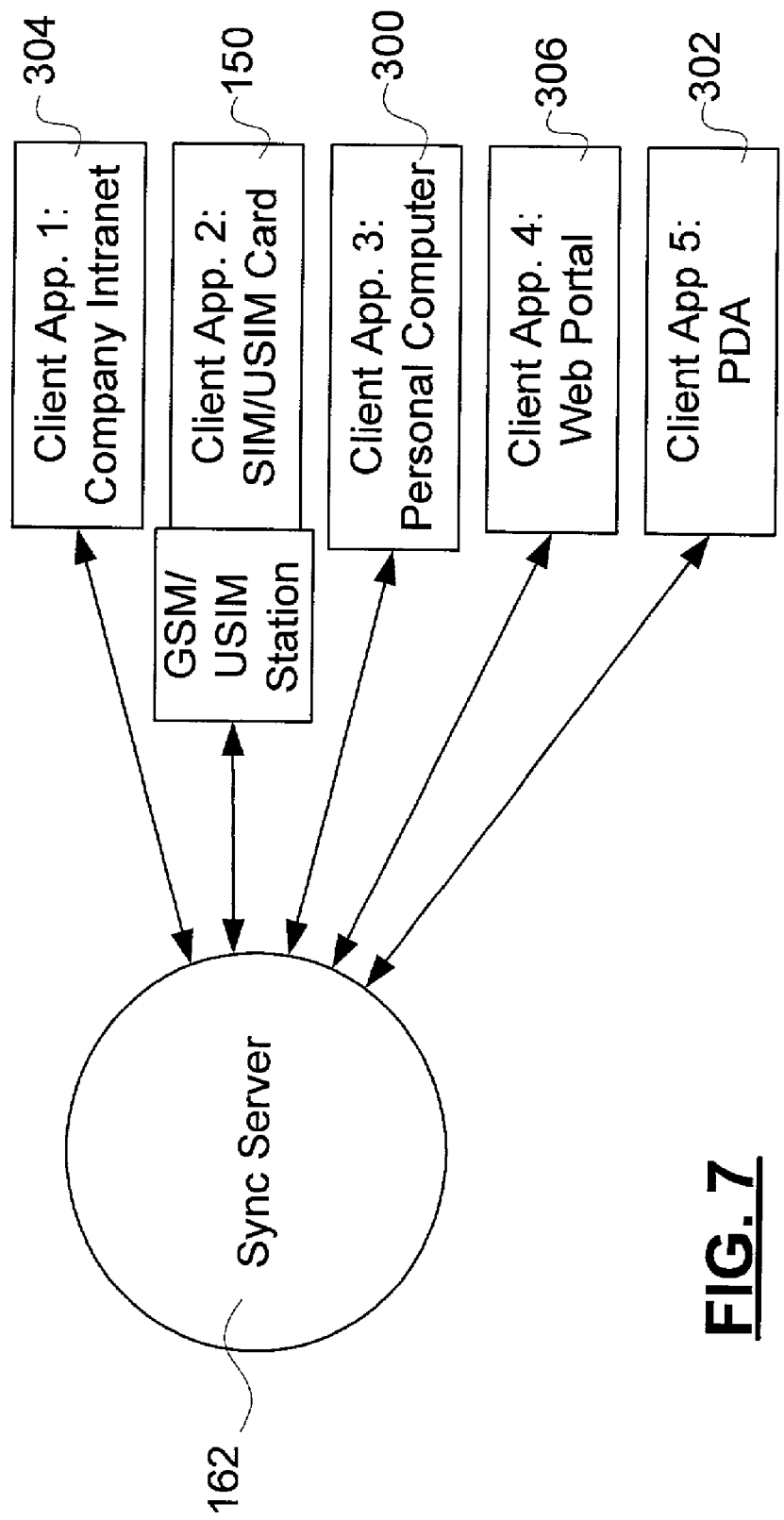
FIG. 7 is a block diagram of a synchronization server adapted to use NOC messages in accordance with the invention.

FIG. 7 is a block diagram illustrating file synchronization, and what one implementation of a sync server 162 is adapted to do upon receipt of one or more NOC messages. Subscribers to a synchronization service have a plurality of different communications enabled devices with overlapping functions. A prime example of this is an address book. The phonebook 202 stored on the SIM card 150 or a USIM card may be only one of several places where such information is stored. A personal computer running a personal organizer application 300, a personal digital assistant (PDA) with an address book feature 302, a personal directory on a company intranet 304, and a web portal offering a personalized address book service 306 may all store the address book for the subscriber. The sync server 162 provides a service of ensuring that each of these different phonebook/address files are synchronized and current. When a NOC message is sent from a SIM/USIM card 150 through a GSM/USIM station, like the GSM phone 152 to the sync server 162, contents of the message are used by the sync server 162 to identify the subscriber, select one or more client applications that require an update in view of the NOC message, and issue update messages to the selected client applications to effect the changes to all of the subscriber's address books.

The invention therefore provides a method and system for detecting changes in memories stored on electronic tokens in general, and SIM/USIM cards in particular. The token resident change detection applet may be automated and the communication of the change can be effected without user intervention.

The embodiments of the invention described above are intended to be exemplary only. The scope of the invention is therefore intended to be limited solely by the scope of the appended claims.

We claim:

1. A method applied by an electronic token comprising a microprocessor and a memory for identifying changed records among a plurality of records stored in the memory of the electronic token, the method comprising:

for each one of the plurality of records:
calculating in the electronic token a respective change detection code (CDC) associated with the record; and
comparing in the electronic token the calculated CDC with a corresponding CDC stored in the token and associated with the record in order to determine if the record has been changed since the CDC stored in the token and associated with the record was calculated; and if the calculated CDC of at least one of the plurality of records is not equal to the corresponding stored CDC, preparing a Short message Service (SMS) message in the electronic token and sending the SMS message from the electronic token to a registering element, which SMS message includes a content of at least one record which has been identified as changed, and saving in the token the calculated CDC of the record in replacement of the previous stored CDC of the record.

2. A method as claimed in claim 1, wherein calculating the respective CDC comprises calculating a cyclic redundancy check (CRC).

3. A method as claimed in claim 1, wherein comparing the calculated CDC with the corresponding stored CDC further comprises determining information regarding the type of change, the information being input to a predefined algorithm that executes in the memory.

4. A method as claimed in claim 3, wherein the SMS message is issued to an electronic token reader in which the electronic token is docked, the SMS message containing at least one parameter regarding the change for use by the registering element to which the message is sent by a token-resident applet via the electronic token reader.

5. A method as claimed in claim 4, wherein further comprising setting a response pending flag which is cleared if an acknowledgement of the SMS message is received, wherein the flag is used to indicate that an SMS message has not been acknowledged.

6. A method as claimed in claim 5, wherein determining comprises using a flag set in association with the stored CDC, in conjunction with the values of the stored CDC and calculated CDC to determine if the record was changed since a last acknowledged SMS message related to the record was sent.

7. A method as claimed in claim 4, wherein upon receipt of the SMS message, the registering element performs at least one of: synchronization of data across multiple data stores; update of a system with respect to the record; back-up of the record; and provision of a service feature in dependence on the change to the record.

8. A method as claimed in claim 7, wherein the short message service (SMS) message is issued to a service provider that has access to the registering element.

9. A method as claimed in claim 8, wherein the predefined algorithm comprises:

receiving the information relating to the change;
formulating a notice of change (NOC) message; and
inserting as many NOC messages as possible into the SMS message before sending the SMS message.

10. A method as claimed in claim 9, wherein the electronic token is a subscriber identity module and comparing further comprises applying a comparison algorithm that executes on the subscriber identity module, the comparison algorithm being adapted to compare a CDC of each of a plurality of abbreviated dialing numbers (ADN) in the file; and the step of issuing comprises directing a SMS message to the registering element, which is adapted to perform at least one of the following: ensure conformity of the file with other versions of the file stored elsewhere; back-up the file; and, provide a service feature in dependence on the change.

11. A method as claimed in claim 7, wherein sending comprises formulating the message by inserting the at least one parameter into respective fields of the message, and forwarding the message to the registration element.

12. A method as claimed in claim 11, wherein formulating comprises inserting a record identifier, and information that specifies the change.

13. A method as claimed in claim 12, wherein formulating comprises inserting a value that indicates one of the following: the record was added; the record was deleted; and the record was modified.

14. An apparatus for providing a service to a subscriber having an electronic token, the apparatus comprising:
a change detection applet stored on an electronic token including a microprocessor and a memory, the electronic token storing a plurality of records and a set of change detection codes (CDCs), each CDC being associated with a respective stored record, said applet being designed to be executed by the microprocessor of the electronic token and for identifying any record that has been changed since a respective change detection code (CDC) associated with the record was stored in the token, by calculating a current CDC for the record and comparing the current CDC with the stored CDC, the applet being further designed to send a Short Message Service (SMS) message to a registering element when the current CDC does not match the stored CDC, the SMS message including a content of the associated record, the applet being further designed to save the calculated CDC in the token as the stored CDC when the current CDC does not match the stored CDC.

15. An apparatus as claimed in claim 14, wherein the change detection applet calculates a cyclic redundancy check (CRC) to derive the current CDC.

16. An apparatus as claimed in claim 15, further comprising a registering element adapted to receive the message and use a content of the message to perform at least one of the following: back up records for which the message was generated; synchronize the file with other files remotely stored but commonly associated with a subscriber; and, provide a service dependent upon the detected change.

17. An apparatus as claimed in claim 14, wherein the electronic token is docked in a communications enabled device that comprises an electronic token reader adapted to exchange data in conformity with a predetermined protocol.

18. An apparatus as claimed in claim 17, wherein the electronic token is one of: a subscriber identity module (SIM) card compliant with a global system for mobile communications (GSM) standard; and a universal SIM (USIM) card.

19. An apparatus as claimed in claim 17, wherein the communications enabled device is adapted to function as a short message service (SMS) enabled telephone.

20. An apparatus as claimed in claim 14, further comprising a data store for storing a set of response pending flags that are associated with a list of records in the file, and the change detection applet is further adapted to use the set of response pending flags to determine if a record may have been changed since a last SMS message for the record was acknowledged.

21. An apparatus as claimed in claim 20, wherein the set of response pending flags comprises at least two flags used to encode change information, and the change detection applet is further adapted to use the plurality of flags, in conjunction with the stored CDC and current CDC, to determine if an SMS message related to the record is to be sent.

22. A change detection applet stored and executed on an electronic token including a microprocessor and a memory, the electronic token storing a plurality of records and a set of change detection codes (CDCs), each CDC being associated with a respective stored record and identifying a version of the stored record, said applet being designed to be executed by the microprocessor of the electronic token for identifying any record that has been changed since a respective change detection code (CDC) associated with that record was stored in the token, by calculating a respective current CDC for each record and comparing the current CDC with the corresponding stored CDC of the record, the applet being further designed to prepare and send a Short Message Service (SMS) message to a registering element when the current CDC does not match the stored CDC, the SMS message including a content of the record, the applet being further designed to save the calculated CDC as the stored CDC when the current CDC does not match the stored CDC.

23. An electronic token storing and running an applet as claimed in claim 22.

* * * * *